(12) United States Patent
Santi

(10) Patent No.: US 9,527,678 B2
(45) Date of Patent: Dec. 27, 2016

(54) UNIT FOR TRANSFERRING AND UP-ENDING SEALED PACKAGES CONTAINING A POURABLE FOOD PRODUCT

(71) Applicant: Tetra Laval Holdings & Finance S.A., Pully (CH)

(72) Inventor: Franco Santi, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 14/771,163

(22) PCT Filed: Mar. 4, 2014

(86) PCT No.: PCT/EP2014/054130
§ 371 (c)(1),
(2) Date: Aug. 27, 2015

(87) PCT Pub. No.: WO2014/146893
PCT Pub. Date: Sep. 25, 2014

(65) Prior Publication Data
US 2016/0075522 A1 Mar. 17, 2016

(30) Foreign Application Priority Data

Mar. 22, 2013 (EP) .................................... 13160706

(51) Int. Cl.
*B65G 47/84* (2006.01)
*B65B 61/28* (2006.01)
*B65G 47/248* (2006.01)

(52) U.S. Cl.
CPC ............. *B65G 47/248* (2013.01); *B65B 61/28* (2013.01); *B65G 47/846* (2013.01); *B65G 2201/0235* (2013.01)

(58) Field of Classification Search
CPC ........ B65G 47/84; B65G 47/248; B65B 61/28
(Continued)

(56) References Cited

U.S. PATENT DOCUMENTS 2,984,337 A * 5/1961 Couch ..................... B65B 43/60
156/DIG. 25
4,050,570 A * 9/1977 Kramer ................ B65G 47/248
198/398
(Continued)

FOREIGN PATENT DOCUMENTS

CH 431 377 A 2/1967
DE 24 21 630 A1 11/1974
(Continued)

OTHER PUBLICATIONS

Extended European Search Report issued on Sep. 10, 2013, by the European Patent Office in corresponding European Patent Application No. 13160706.1-1707 (4 pages).
(Continued)

*Primary Examiner* — Douglas Hess
(74) *Attorney, Agent, or Firm* — Buchanan Ingersoll & Rooney PC

(57) ABSTRACT

There is described a unit for transferring and up-ending at least one sealed package containing a pourable food products, comprising: a rotary member which may rotate about a first axis; and at least one push member which is articulated onto rotary member and cooperates with a respective package to feed it along a first path, which extends from an infeed station to an out-feed station; push member comprising a push surface elongated along a first direction transversal to first axis and adapted to contact, in use, respective package in order to convey it along a first path; the orthogonal projection of first direction on a plane orthogonal to first axis being elongated along a second direction; direction is
(Continued)

distinct with respect to a third direction, which is radial relative to first axis, at least at input station.

14 Claims, 5 Drawing Sheets

(58) Field of Classification Search
USPC .............. 198/406–408, 410–413, 415, 416
See application file for complete search history.

(56) References Cited

U.S. PATENT DOCUMENTS

| | | | | |
|---|---|---|---|---|
| 4,625,854 | A * | 12/1986 | Deichmann | B41F 17/18 198/416 |
| 4,751,997 | A * | 6/1988 | Hirsch | B65G 47/248 198/407 |
| 4,804,076 | A | 2/1989 | Pace | |
| 5,299,675 | A * | 4/1994 | Schumann | B65G 47/1457 198/392 |
| 5,531,310 | A * | 7/1996 | Itoh | B65G 47/24 198/395 |
| 5,765,675 | A * | 6/1998 | Draghetti | B65G 47/24 131/94 |
| 6,109,420 | A * | 8/2000 | Poppi | B65G 47/248 198/408 |
| 6,808,060 | B1 * | 10/2004 | Giometti | B65G 21/2072 198/399 |
| 9,027,732 | B2 * | 5/2015 | Santi | B65G 47/248 198/408 |
| 2003/0106778 | A1 | 6/2003 | Hurst | |
| 2013/0284561 | A1 | 10/2013 | Santi | |

FOREIGN PATENT DOCUMENTS

| | | |
|---|---|---|
| DE | 10 2008 004 437 A1 | 4/2009 |
| EP | 0 887 268 A1 | 12/1998 |
| EP | 2 481 692 A1 | 8/2012 |
| GB | 1 457 611 A | 12/1976 |

OTHER PUBLICATIONS

International Search Report (PCT/ISA/210) mailed on Jul. 7, 2014, by the European Patent Office as the International Searching Authority for International Application No. PCT/EP2014/054130.
Written Opinion (PCT/ISA/237) mailed on Jul. 7, 2014, by the European Patent Office as the International Searching Authority for International Application No. PCT/EP2014/054130.

* cited by examiner

UNIT FOR TRANSFERRING AND UP-ENDING SEALED PACKAGES CONTAINING A POURABLE FOOD PRODUCT

TECHNICAL FIELD

The present invention relates to a unit for transferring and up-ending sealed packages containing a pourable food product.

BACKGROUND OF INVENTION

As is known, many pourable food products, such as beverages, fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of layers of heat-seal plastic material, e.g. polyethylene films, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally into a tube.

The tube is filled with the sterilized or sterile-processed food product, and is sealed and cut along equally spaced cross sections to form the packages.

Units are known, for example from Italian Patent application TO2007A000677 in the name of the same Applicant, for transferring and up-ending sealed packages of pourable food products.

More specifically, such units transfer the packages successively along a path from an infeed station to an outfeed station, and simultaneously up-end the packages from an infeed position, in which the packages are positioned with their axis tilted relative to the horizontal, into an outfeed position, in which the packages are positioned with their axis substantially vertical.

Known units receive the packages at the infeed station from a first conveyor, and feed them to a second conveyor at the out-feed station.

More specifically, the first conveyor supplies the up-ending and transfer unit with packages in the infeed position, and the second conveyor withdraws the packages from the unit in the out-feed position.

The known units substantially comprise a rotary member having a number of push arms which receive respective packages at an infeed station of the path and cooperate with respective packages to push them along the path; and two fixed rails extending substantially along the path and cooperating with the packages to ease them from the tilted infeed position to the out-feed position.

In detail, each push arm is articulated relative to the rotary member and comprises a respective cam follower which interacts with a fixed cam for gradually varying its inclination relative to the rotation axis of the rotary member along the path from the infeed position to the out-feed position.

More specifically, the push arms are elongated along respective first directions.

Still more precisely, the projections of the first directions on a plane orthogonal to the rotation axis of the rotary member extend radially to the same rotation axis.

Furthermore, the projections of the axes of the packages on the above-identified plane are skew relative to the rotation axis of the rotary member.

In other words, the projections of the axes of the packages are not radial to the rotation axis of the rotary member.

Though efficient, units of the above type leave room for improvement.

More specifically, the Applicant has observed that, due to the above configuration of the push arms, the thrust exerted by the push arms is not perfectly uniform on the faces of the respective packages.

There is therefore the risk that the packages are not fully controlled when pushed by respective push arms.

As a result, there is the risk that the packages jam inside the unit, thus interrupting the operation of the packaging machine.

A need is therefore felt within the industry to reduce as much as possible the risk that the operation of the packaging machine is interrupted.

Furthermore, there is the risk that the not perfect uniform contact between each push arm and the abutting surface of the respective package generates a stress on those respective packages, especially at high productivity rate of the packaging machine.

Accordingly, there is the risk to penalize the final shaping quality of the packages, especially at high productivity rates of the packaging machine.

A need is therefore felt within the industry to increase, as much as possible, the final shaping quality of the packages, especially at the above-mentioned high productivity rates.

DISCLOSURE OF INVENTION

It is an object of the present invention to provide a unit for transferring and up-ending at least one sealed package of a pourable food product, designed to meet to at least one of the aforementioned need.

According to the present invention, there is provided a unit for transferring and up-ending at least one sealed package of a pourable food product, as claimed in claim 1.

BRIEF DESCRIPTION OF THE DRAWINGS

A preferred, non-limiting embodiment of the present invention will be described by way of example with reference to the attached drawings, in which.

DETAILED DESCRIPTION OF PREFERRED EMBODIMENTS

Number 1 in FIGS. 1 to 4 indicates as a whole a unit for transferring and up-ending sealed, packages 2 of food products, such as beverages, fruit juice, semi-liquid products, and pourable food products in general. More specifically, each package 2 is fitted with known external opening means (not shown), and is elongated along an axis A.

Figure 5:
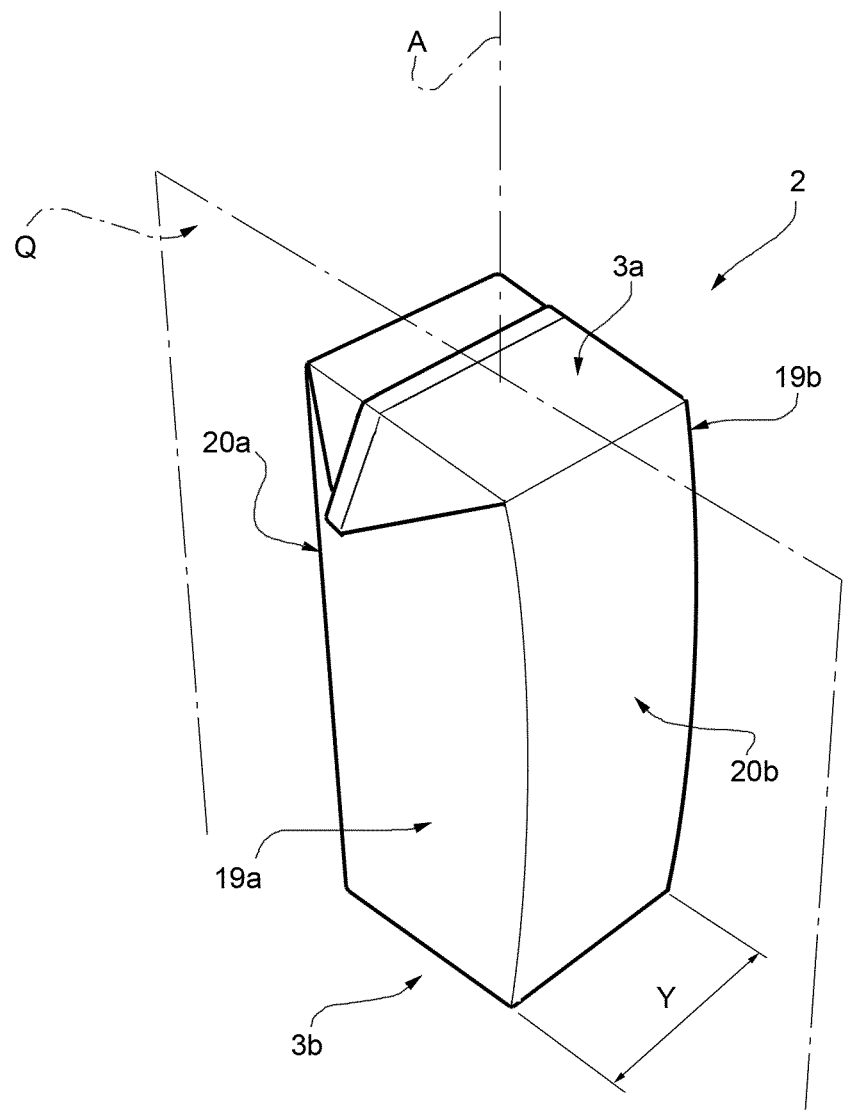
FIG. 5 is a perspective enlarged view of one sealed package processed by the unit of FIGS. 1 to 4.

With particular reference to FIG. 5, each package 2 comprises:
a top face 3a and a bottom face 3b opposite to each other;
a pair of lateral faces 19a, 19b parallel and opposite to each other, parallel to axis A and interposed between faces 3a, 3b; and
a pair of lateral faces 20a, 20b opposite to each other and interposed between faces 3a, 3b.

Each package 2 also comprises a symmetry plane Q onto which axis A lies and which is parallel and equally spaced from faces 19a, 19b.

Unit 1 is preferably designed for use on an automatic packaging machine (not shown as a whole) for producing packages 2 of food products from laminated strip packaging material, and defines a work station of the packaging machine.

Figure 1:
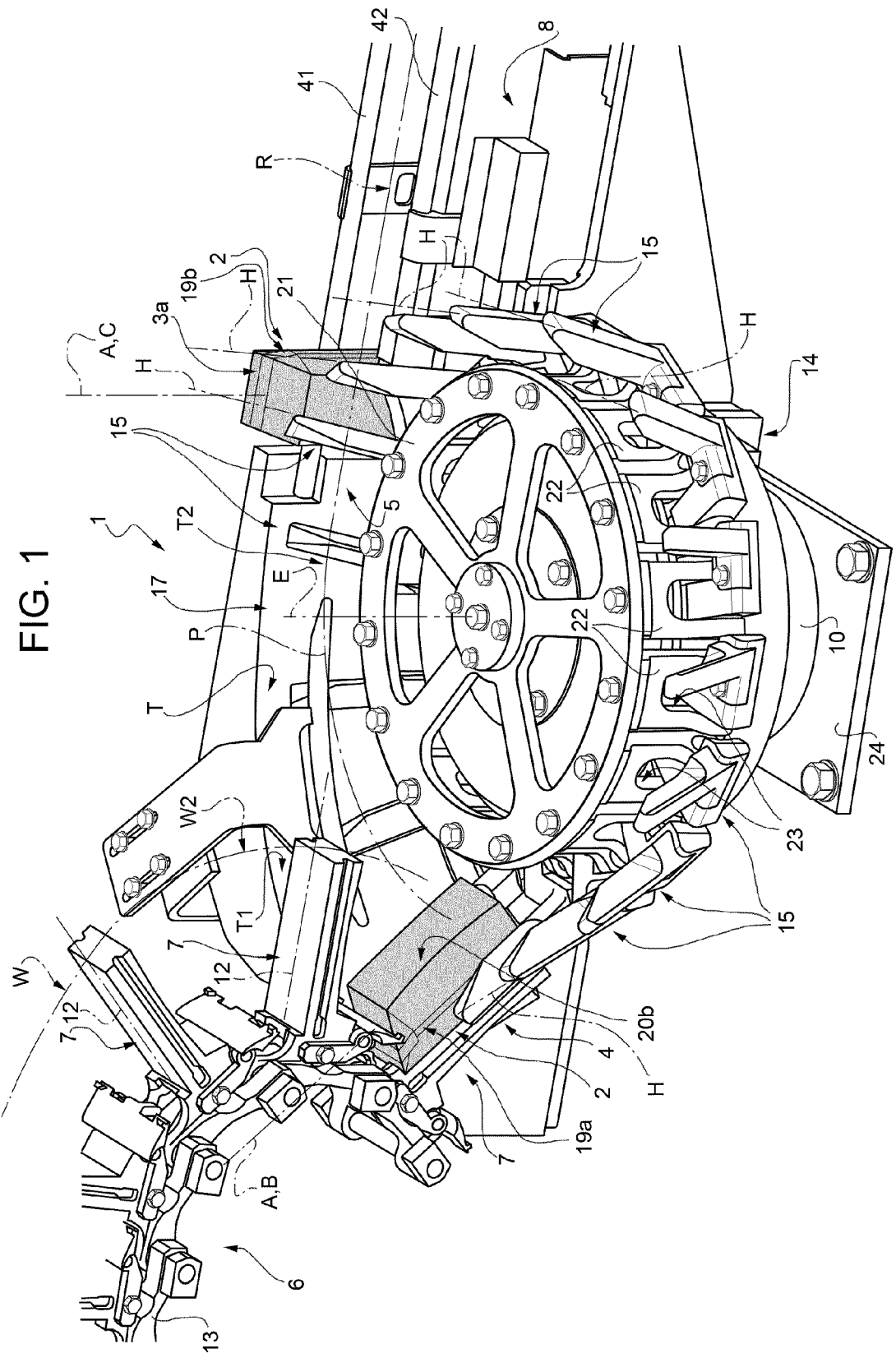
FIG. 1 is a perspective view, with parts removed for clarity, of a unit for transferring and up-ending sealed packages of pourable food products in accordance with the present invention, of a first conveyor for feeding the packages to the unit and of a second conveyor for receiving the packages from the unit.
Figure 2:
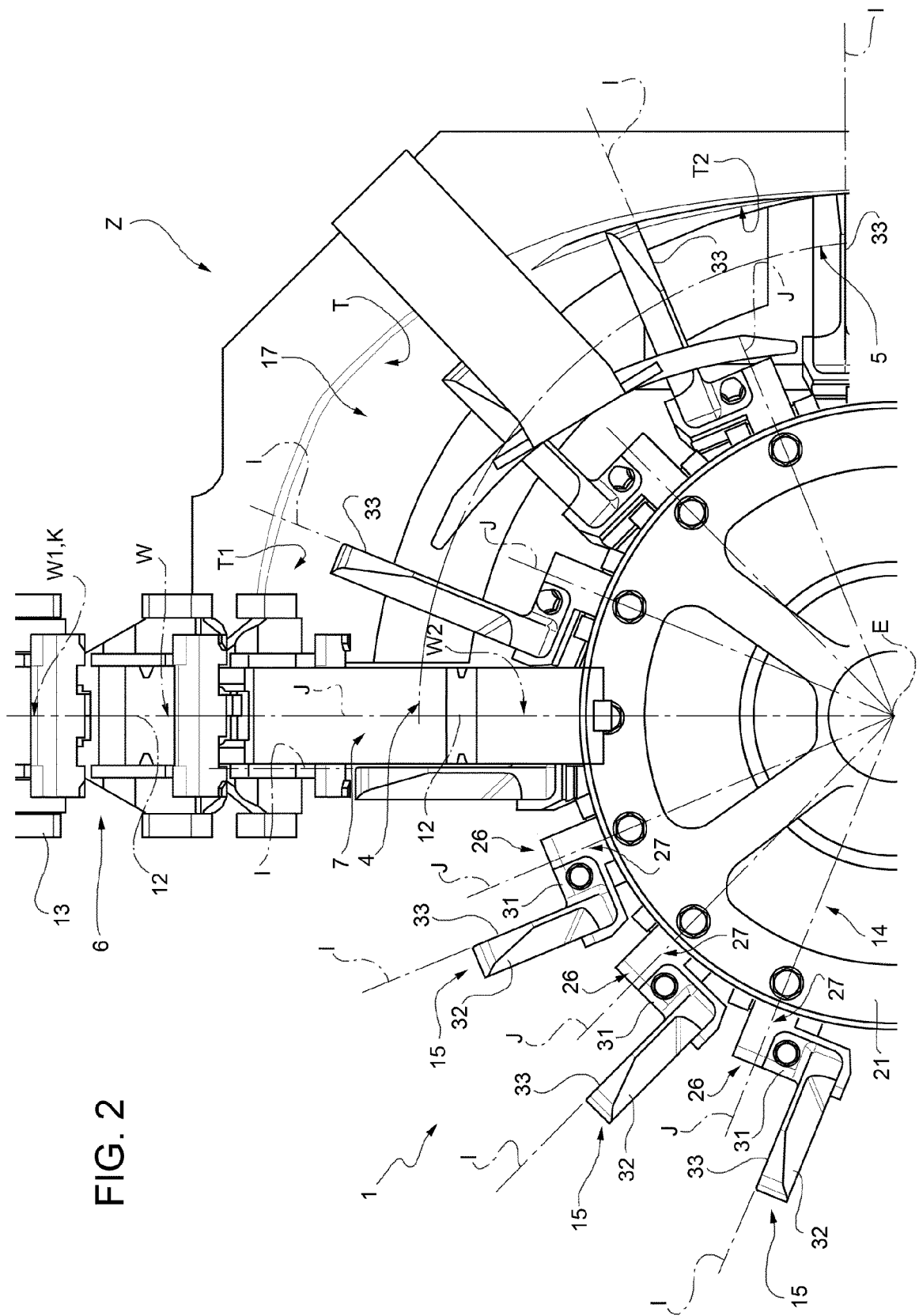
FIG. 2 is a top view, with parts removed for clarity, of the unit and of the first conveyor and the second conveyor of FIG. 1.

With reference to FIGS. 1 and 2, unit 1 feeds a succession of packages 2 continuously along a path P extending from an infeed station 4 to an outfeed station 5, and simultaneously up-ends packages 2 continuously from an infeed position, in which they are positioned with respective axes A oriented in a direction B, into an out-feed position, in which they are positioned with respective axes A oriented in a direction C crosswise to direction B, and with faces 3a facing upwards.

In the embodiment shown, directions B and C are inclined to each other.

In particular, direction C and, therefore, axis A is vertical at out-feed station 5.

More specifically, unit 1 receives packages 2 continuously and successively at station 4 from a conveyor 6 with respective axes A inclined to the horizontal, and feeds them, in the out-feed position, to a conveyor 8 (FIG. 1) at out-feed station 5.

In the out-feed position, axis A of each package 2 is vertical.

Conveyor 6 substantially comprises:
a chain 13 which moves along an endless path; and
a plurality of flat rectangular paddles 7, which protrudes from chain 13 and are driven by chain 13.

Chain 13 comprises two opposite, respectively forward and return, branches.

More specifically, the forward and return branches extend in a horizontal direction in use.

The forward branch is arranged, in the embodiment shown, above the return branch.

The endless path also comprises two opposite vertical curved portions, each connecting respective superimposed ends of the forward and return branches.

In detail, paddles 7 support respective packages 2 positioned with axes A parallel to paddles 7, and feed them along a path W terminating at station 4 where packages 2 are picked up by unit 1.

More specifically, paddles 7 contact faces 20b of respective packages 2 (FIGS. 1 and 2) at station 4. In detail, faces 20b are arranged downstream of corresponding faces 20a, when respective packages 2 are fed along path W.

Still more precisely, paddles 7, at station 4, are arranged upstream of respective packages 2, proceeding according to the advancing direction of paddles 7 along path W.

Path W comprises (FIGS. 1 and 2):
a substantially horizontal main portion W1 defined by the forward branch of the path of paddles 7; and
an end portion W2 terminating at station 4, and along which packages 2 travel along a curved path about a horizontal axis.

Portion W2 is arranged downstream of portion W1, proceeding according to the advancing direction of paddles 7 along path W.

Furthermore, each paddle 7 comprises a centre-line 12 which lies in a plane orthogonal to path W and divides respective paddle 7 in two halves equal to each other with respect to the above-identified centre-line 12.

Centre-line 12 of each paddle 7 is arranged in correspondence of and lies on symmetry plane Q of respective package 2.

Furthermore, each centre-line 12 coincides with an extension axis of relative paddle 7 and is vertical, in the embodiment shown, when relative paddle 7 travels along portion W1 of path W.

At station 5, unit 1 feeds packages 2 successively onto belt conveyor 8 (only partially shown in FIG. 1) and along a substantially straight path R tangent to an end portion of path P. More specifically, station 5 is defined by an intermediate portion of a top forward branch (not shown) of the belt of conveyor 8, onto which packages 2 are fed successively at the end of path P.

More specifically, on the opposite side of station 5, conveyor 8 defines an output of the packaging machine in a manner not shown, and so conveys packages 2, in the out-feed position, off the packaging machine.

Path P is arc-shaped about an axis E parallel to direction C. In the embodiment shown, path P extends along a 90° angle from station 4 to station 5.

Unit 1 also comprises (FIG. 4):
a stator 10 connected to a fixed structure 24 of unit 1;
a drive shaft 11 rotating continuously about axis E and powered by an electric motor of the packaging machine in known manner not shown; and
a substantially cylindrical rotary member 14 of axis E, fitted to shaft 11.

Furthermore unit 1 comprises.
a plurality of push arms 15 for removing respective packages 2 from corresponding paddles 7 of conveyor 6 at station 4, and feeding them along path P to station 5;
a plurality of support members 26 operatively connected to respective push arms 15, driven in rotation by member 14 about axis E, and articulated onto member 14 about respective axes F tangential and perpendicular to axis E (FIG. 3); and a cam 18 (FIG. 4) supported in a fixed position with respect to axis E by fixed structure 24, and which defines a groove 34 engaged by a plurality of cam followers 29 carried by respective support members 26.

Unit 1 also comprises a guide 17 which contacts packages 2 along path P to up-end them from the infeed position to the out-feed position Member 14 is substantially drum-shaped, and has a top wall 21 with a through hole engaged by shaft 11; and a plurality of spaced forks 22 downwardly projecting from an outer circumferential edge of wall 21.

Figure 3:
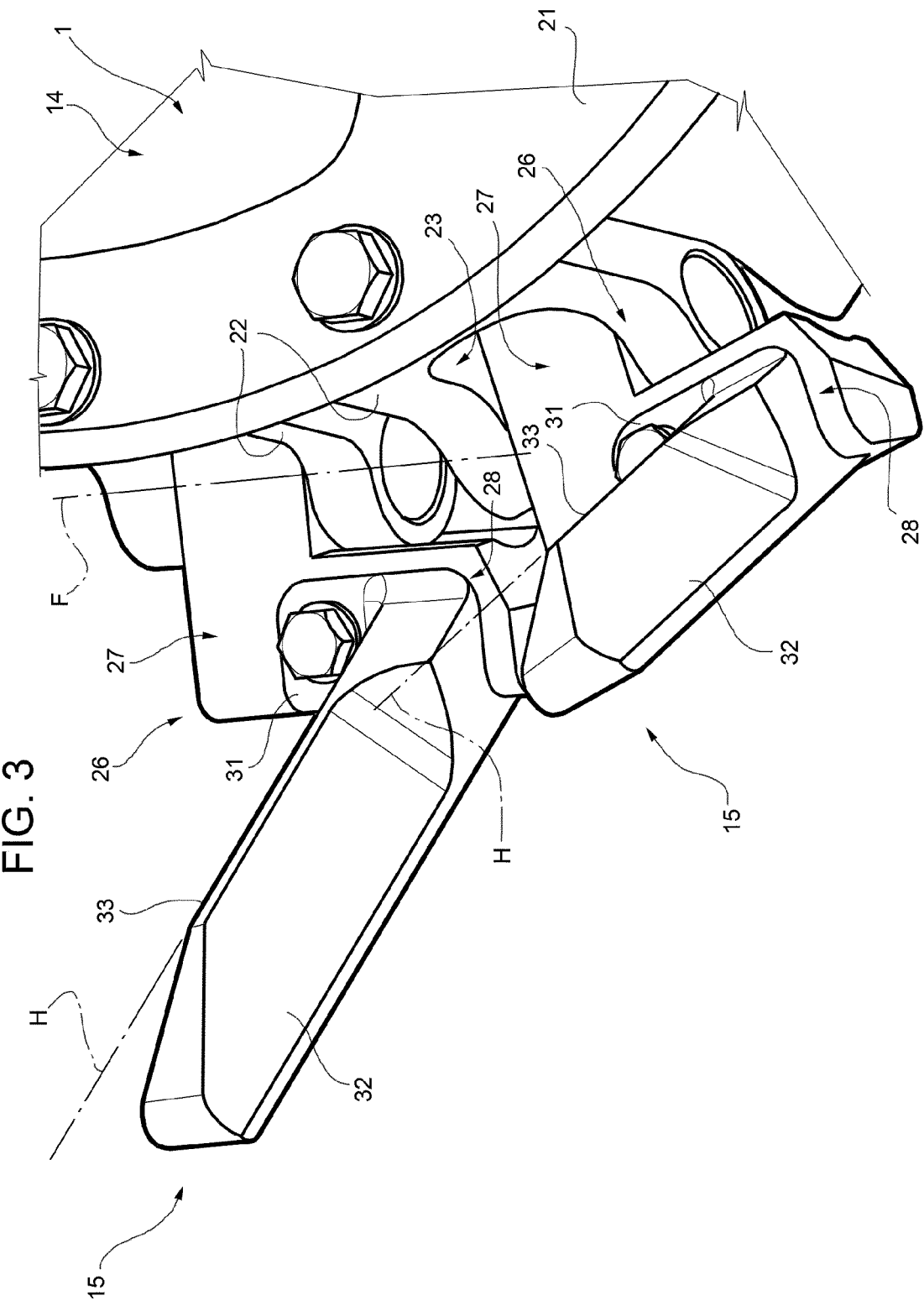
FIG. 3 is a perspective enlarged view of the unit of FIGS. 1 and 2.
Figure 4:
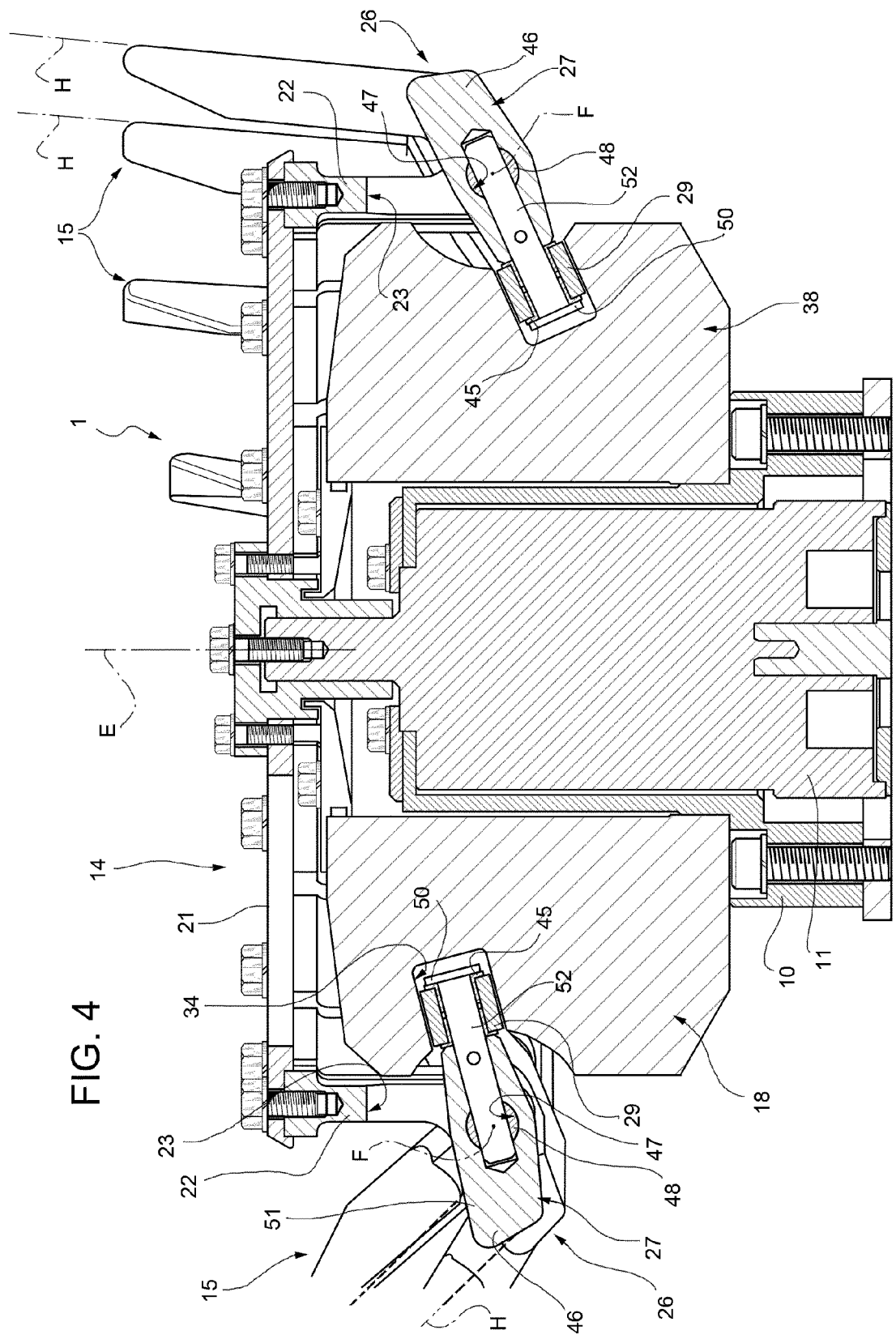
FIG. 4 is an axial section of the unit of FIGS. 1 to 3.

As evident from FIGS. 1, 3 and 4, forks 22 define respective seats 23, which are open radially to axis E.

Furthermore, arms 15 and forks 22 are equally spaced about axis E, and are sixteen in number in the example shown.

Each arm 15 substantially comprises (FIGS. 1 and 2):
a portion 31 fixed to respective support member 26, by using a relative screw in the embodiment shown; and
a portion 32, which defines a flat portion surface 33 contacting face 19a of a relative package 2 to feed it along path P.

Portion 31 of each arm 15 is elongated parallel to corresponding axis F.

Portion 32 of each arm 15 is elongated parallel to a direction H, which is inclined relative to corresponding axis F.

As a result, surface 33 lies in a plane parallel to direction H.

As a result of the interaction of respective cam follower 29 with groove 34 of cam 18, each arm 15 cyclically moves from a first operating position receiving relative package 2 to a second operating releasing relative package 2, and vice-versa.

In particular, arms 15 are arranged in the first operating position at station 4 and in the second operation position at station 5.

More specifically, in the first operating position, each arm 15 is located at station 4, with direction H of respective surface 33 parallel to direction B; and, in the second operating position, arm 15 is located at station 5, with direction H of respective surface 33 parallel to direction C.

For unit 1 to work properly, surface 33 of each arm 15 (FIG. 2) is positioned parallel to axis A of relative package 2 along the whole length of path P.

Furthermore, each arm 15 is of maximum radial extension with respect to axis E in the first operating position, and is of minimum radial extension with respect to axis E in the second operating position.

The orthogonal projection of direction H of surface 33 of each arm 15 on a plane Z orthogonal to axis E is elongated along a respective direction I (FIG. 2).

Advantageously, each direction I is distinct from a direction J radial to axis E, at least at input station 4 (FIG. 2).

In other words, direction I is not radial to axis E.

In detail, each direction I of a corresponding arm 15 is associated to a direction J, according to the following association law.

When each arm 15 receives corresponding package 2 at infeed station 4, respective direction J is parallel and aligned with a direction K, which joins centre-lines 12 of respective paddles 7 travelling along portion W1 of path W (FIG. 2).

Still more precisely, centre-lines 12 move along direction K, when respective paddles 7 move along portion W1 of path W.

In the embodiment shown, direction I is parallel to direction J and spaced therefrom from a half of width Y of packages 2, along whole path P.

Width Y is measured orthogonally to surface 33 and corresponds, therefore, to distance between faces 19a, 19b.

In this way, as evident from FIG. 3, as each arm 15 travels from infeed station 4 to out-feed station 5, the whole respective surface 33 remains substantially in uniform contact with face 19a of relative package 2.

Each support member 26 comprises (FIGS. 3 and 4):
an arm 27 which carries, in turn, cam follower 29 and is hinged to a respective fork 22 of member 14 about a respective axis F; and
an arm 28 to which portion 31 of a respective arm 15 is fixed.

Still more precisely, each arm 27 comprises (FIG. 4):
an end 45, which is radially inner relative to axis E and carries respective cam follower 29; and
an end 46, which is radially outer relative to axis E and from which arm 28 protrudes orthogonally to arm 27 parallel to respective axis F.

Furthermore, each arm 27 is hinged to respective fork 22 in a position, which is intermediate between ends 45, 46.

Each arm 27 comprises a seat 47 and each fork 22 comprises a pivot 48 which engages seat 47 in a freely rotatable way about respective axis F.

Each pivot 48 and respective seat 47 extend substantially parallel to corresponding axis F.

In the embodiment shown, each arm 27 comprises, in turn:
a support 50 for respective cam follower 29;
a body 51 integral with arm 28 and defining seat 47; and
a pin 52 extending orthogonally to axis F and connecting support 50 and body 51.

Arm 28 projects from arm 27 of corresponding support member 26 towards a direction which is opposite to the rotation direction of member 14.

In this way, during the rotation of member 14 about axis E, each arm 27 reaches stations 4, 5 before arm 28 of corresponding support member 26.

Each arm 28 is substantially orthogonal to arm 27 of respective support member 26.

Each arm 15 upwardly projects from respective arm 28 of respective support member 26.

In the embodiment shown, arms 27, 28 of each support member 26 are integral to each other.

Furthermore, support members 26 are, in the embodiment shown, angularly equi-spaced about axis E.

Groove 34 of cam 18 defines a continuous constraint for the surfaces of cam followers 29 of support members 26, and, from the first to the second operating position, defines a continuous succession of intermediate positions in which each arm 15 interacts with and pushes relative package 2, and in which portion 32 of each arm 15 is eased from being parallel to direction B to being parallel to direction C.

Groove 34 is shaped in such a way to prevent any relative movement between surface 33 of each push arm 15 and face 19a of relative package 2, at least at station 4.

In this way, packages 2 and relative push arm 15 move integral to each other, at least at station 4.

Cam 18 is fitted through loosely with shaft 11, is contained within the radial extension of forks 22, and is interposed radially, with respect to axis E, between shaft 11 and arms 15 (FIG. 4).

With particular reference to FIG. 4, cam 18 comprises a substantially cylindrical tubular body 38, of axis E, connected to a fixed part of unit 1, and fitted through loosely with shaft 11, which in turn is fitted in axially fixed, rotary manner to body 38 in known manner not shown in detail.

Groove 34 of cam 18 is located along the radially outer periphery of the cam, is annularly shaped, and is engaged in sliding manner by cam followers 29 associated to respective push arms 15.

More specifically, groove 34 extends at varying radial distances from axis E to move cam followers 29, and hence arms 15, cyclically towards and away from axis E.

Guide 17 is curved and extends substantially along path P and cooperates with packages 2 to ease them from the infeed to the out-feed position.

With reference to FIGS. 1 and 2, guide 17 defines a supporting and slide surface T for packages 2, which extends substantially along path P and slopes gradually with respect to axis E from a portion T1, parallel to direction B and adjacent to station 4, to a substantially flat, vertical out-feed portion T2 parallel to direction C and adjacent to station 5.

More specifically, when packages 2 move from infeed station 4 to out-feed station 5, respective faces 19a are pushed by surfaces 33 of corresponding push arms 15 and respective faces 20a slide onto surface T of guide 17.

In the embodiment shown, surface T is full. Alternatively, guide 17 could comprise a pair of rails which define surface T.

Finally, from station 5, unit 1 comprises a pair of lateral retaining rails 41, 42 parallel to each other and are adapted to retain packages 2 onto conveyor 8 (FIG. 1).

In use, paddles 7 convey packages 2 along path W and member 14 drives in rotation push arms 15 about axis E.

Operation of unit 1 will now be described with reference to one package 2, to the respective paddle 7 of conveyor 6 and to respective arm 15 of member 14.

Furthermore, operation of unit 1 will be described as of a cycle-start condition, in which paddle 7 of conveyor 6 is located at station 4, and arm 15 is set to the first operating position at station 4, alongside and upstream of face 19a of package 2.

In particular, at station 4, direction J is parallel and aligned with direction K and with centre-plane Q of package 2.

In other words, the projection of portion W1 of path W, and therefore of axis A, on plane Z is radial to axis E.

Furthermore, at station 4 direction I is parallel and distinct from direction J and, therefore, from direction K.

In particular, direction I is spaced from corresponding directions J, K by a distance which equals a half of width Y of package 2.

In other words, direction I is not radial relative to axis E.

As member 14 rotates about axis E, face 19a of package 2 is pushed by arm 15 while face 20a slides on surface T of guide 17.

Furthermore, surface 33 remains parallel and in full contact with face 19a of packages 2, along the whole path P.

Furthermore, direction I remains parallel and distinct from direction J, along the whole extension of path P.

In other words, direction I is never arranged radially to axis E, along the whole extension of path P.

The projection of axis A on plane Z remains radial to axis E, along the whole extension of path P.

By virtue of the design of guide 17, package 2, as member 14 rotates about axis E, is eased into the out-feed position, and in particular, is gradually up-ended to ease the face of the package opposite and parallel to face 3a onto conveyor 8 as of station 5.

As member 14 rotates from station 4 to station 5, cam follower 29 slides inside groove 34 of cam 18.

As a result, arm 27 of support member 26 rotates about axis F, so as to gradually raise arm 15 from the first operating position to the second operating position.

Cam 18 therefore gradually modifies the rotation of arm 15 with respect to member 14 along path P to adapt the extension direction of portion 32 to the tilt of axis A of package 2 with respect to fixed structure 24, and so set arm 15 into the best condition in which to push package 2.

As a result, package 2 travels along path P, along a 90° arc about axis E, to station 5.

By the time it reaches station 5, the interaction of cam 18 with cam follower 29 sets arm 15 into the second operating position, in which it is detached from package 2.

Package 2 is then fed onto conveyor 8 and by this along path R.

As member 14 continues rotating, arm 15 is gradually moved from the second operating position to the first operating position by the interaction of cam follower 29 with groove 34 of cam 18.

The advantages of unit 1 and the method according to the present invention will be clear from the foregoing description.

In particular, direction I is distinct with respect to direction J, which is radial relative to axis E.

As a consequence, when each package 2 is conveyed along path P, surface 33 of corresponding arm 15 is parallel to axis A and, therefore, to face 19a of package 2.

Due to the above configuration, it is secured a complete a uniform contact between surfaces 33 of arms 15 and relative faces 19a of packages 2.

In this way, the thrust exerted by arms 15 onto respective packages 2 is fully controlled along path P.

As a result, the risk of generating a jam inside unit 1 is lowered with respect to the known solution disclosed in the introductory part of the present description.

Furthermore, the above-identified complete and uniform contact dramatically reduces the stresses generated on packages 2, especially at high productivity rate of the packaging machine. As a result, the final shaping quality of packages 2 can be made particularly high, also at the high productivity rate of the packaging machine.

Clearly, changes may be made to unit 1 according to the present invention without, however, departing from the scope as defined in the accompanying Claims.

The invention claimed is:

1. A unit for transferring and up-ending at least one sealed package containing a pourable food product, comprising:
   a rotary member which may rotate about a first axis;
   at least one push member which is articulated onto said rotary member and cooperates with a respective said package to feed it along a first path, which extends from an infeed station to an out-feed station;
   said push member comprising a push surface elongated along a first direction transversal to said first axis and adapted to contact, in use, said respective package in order to convey it along the first path;
   a support member comprising a first portion which extends radially outward from said first axis and a second portion which extends transversally to said first portion and to which said push member is directly connected;
   an orthogonal projection of said first direction on a plane orthogonal to said first axis being elongated along a second direction; and
   said second direction being distinct with respect to a third direction, which extends radially outwardly from said first axis, at least at said infeed station.

2. The unit of claim 1, wherein said second direction is parallel to a corresponding said third direction, at least at said infeed station.

3. The unit of claim 2, wherein the distance between said second direction and said third direction equals a half of the width of said package to be conveyed, at least at said infeed station; said width being measured orthogonally to said push surface at said infeed station.

4. The unit of claim 1, comprising:
a cam, which is fixed with respect to said first axis; and
said first portion carries a cam follower which interacts with said cam, so as to vary the position of said push member relative to said rotary member.

5. The unit of claim 4, wherein said second portion extends orthogonally to said first portion.

6. The unit of claim 4, wherein said second portion is hinged to said rotary member about a second axis, which is transversal to said first axis.

7. The unit of claim 6, wherein said second axis is radially interposed between said cam follower and said second portion with reference to said first axis.

8. The unit of claim 4, wherein said first portion and said second portion are integral to each other.

9. The unit of claim 4, wherein said cam is shaped in such a way to prevent any relative movement between said push surface and said respective package, at least at said infeed station.

10. The unit of claim 1, comprising guide means which cooperate with said package to up-end it from an infeed position assumed at said infeed station to an out-feed position assumed at an output station of said first path.

11. The packaging machine of claim 1, comprising a second conveyor for conveying said package off the packaging machine, said second conveyor being straight and supplied directly by said unit with said package in said outfeed position.

12. A packaging machine for producing at least one sealed package of a food product, comprising:
a unit comprising:
a rotary member which may rotate about a first axis; and
at least one push member which is articulated onto said rotary member and cooperates with a respective said package to feed it along a first path, which extends from an infeed station to an out-feed station;
said push member comprising a push surface elongated along a first direction transversal to said first axis and adapted to contact, in use, said respective package in order to convey it along a first path;
the orthogonal projection of said first direction on a plane orthogonal to said first axis being elongated along a second direction;
said second direction being distinct with respect to a third direction, which is radial relative to said first axis, at least at said infeed station; and
a conveyor comprising at least one paddle which contacts said respective package to feed it to said unit along a second path and towards said infeed station of said first path;
said second path comprising:
a straight first portion; and
a curved second portion incident with said first path at said infeed station;
said paddle having a centreline orthogonal to said second path and which, in use, is aligned with a symmetry plane of said package parallel to said second path and to a third axis of said package;
said centreline being movable along a fourth direction, when said conveyor moves along said first portion;
said fourth direction being incident to and radial with respect to said first axis of said rotary member.

13. The packaging machine of claim 12, wherein said corresponding third direction is aligned and coincident with said fourth direction, at said infeed station.

14. A transfer unit for transferring at least one package containing a pourable food product, the transfer unit comprising:
a rotary member configured to rotate in a circumferential direction about a first axis;
at least one push member connected to the rotary member, the push member configured to convey the package along a first path which extends from an infeed station to an out-feed station;
the push member comprising a push surface and an opposite surface, the push member possessing a thickness between the push surface and the opposite surface, and the push member being configured to contact the package to convey it along the first path;
the push member extending along a second axis, the second axis being at a midpoint of the thickness of the push member; and
the second axis being spaced apart from the first axis, such that the second axis avoids intersection with the first axis.

* * * * *